United States Patent
Narula et al.

(10) Patent No.: US 11,758,598 B1
(45) Date of Patent: Sep. 12, 2023

(54) AUTOMATED MULTI-CLIENT AND MULTI-MODE WIRELESS DEVICE PAIRING AND CONNECTION METHODS AND SYSTEMS

(71) Applicant: Dell Products, L.P., Round Rock, TX (US)

(72) Inventors: Harpreet Narula, Austin, TX (US); Alok Pant, Austin, TX (US); Brian Eugene Manser, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/659,382

(22) Filed: Apr. 15, 2022

(51) Int. Cl.
　　*H04W 76/14*　　(2018.01)
　　*H04W 12/50*　　(2021.01)
　　*H04W 4/80*　　(2018.01)

(52) U.S. Cl.
　　CPC ............. *H04W 76/14* (2018.02); *H04W 4/80* (2018.02); *H04W 12/50* (2021.01)

(58) Field of Classification Search
　　CPC ........ H04W 76/14; H04W 4/80; H04W 12/50
　　USPC ...................................................... 455/41.2
　　See application file for complete search history.

(56) References Cited

U.S. PATENT DOCUMENTS

| | | | | |
|---|---|---|---|---|
| 10,326,797 | B1* | 6/2019 | Murray | H04L 9/0825 |
| 2013/0282932 | A1* | 10/2013 | Robert | H04W 76/14 |
| | | | | 710/17 |
| 2017/0181628 | A1* | 6/2017 | Burnette | A61B 5/7445 |
| 2021/0165501 | A1* | 6/2021 | Dai | G09C 1/00 |

* cited by examiner

*Primary Examiner* — Eugene Yun
(74) *Attorney, Agent, or Firm* — Fogarty LLP

(57) ABSTRACT

Embodiments allow for multiple instances of a state machine to connect with multiple clients. Additionally, a plurality of connection states, while maintaining a connection with a single physical client device, may support multiple modes. For example, a wireless peripheral device determines whether it is paired with a client device and connects if it is, by selecting a saved long term bonding key, based on a user selected device mode. When a scan timeout expires, the device switches to another saved bonding key. When an overall connection timeout expires, these steps repeat. If the device is not already paired, it pairs with a client by setting long term paring key generation key(s), bonding with the client using the generation key(s) to generate a paring key, distributing the pairing key to the client, and saving the pairing key, as a bonding key, based on user selected device mode.

20 Claims, 5 Drawing Sheets

US 11,758,598 B1

AUTOMATED MULTI-CLIENT AND MULTI-MODE WIRELESS DEVICE PAIRING AND CONNECTION METHODS AND SYSTEMS

FIELD

This disclosure relates generally to Information Handling Systems (IHSs), and, more specifically, to automated multi-client and multi-mode wireless device pairing and connection methods and systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

BLUETOOTH is a wireless technology standard used for exchanging data between IHSs and peripheral devices over short distances using short-wavelength UHF radio waves in the industrial, scientific, and medical radio bands, from 2.400 to 2.485 GHz, and for building personal area networks (PANs). Examples of BLUETOOTH devices include, but are not limited to: mice, keyboards, graphics tablets, image scanners, barcode readers, styluses, cameras, webcams, game pads, memories, monitors, projectors, printers, microphones, headphones, headsets, loudspeakers, etc.

Conventionally, when a user purchases an aftermarket peripheral, such as a Human Interface Device (HID) (e.g., a keyboard or mouse), the factory or manufacturer of the aftermarket peripheral may pre-pair the peripheral to a dongle (e.g., a wireless communications adapter) supplied with the aftermarket peripheral. The dongle is a small piece of hardware device that plugs into a port of the IHS (e.g., a Universal Serial Bus or "USB" port) and allows the peripheral to connect to the IHS via a Radio Frequency (RF) connection or via a wireless protocol, such as BLUETOOTH. Because the peripherals are already paired to the dongle prior to being shipped from the factory, there is no need for the customer to perform additional pairing processes.

With respect to wireless peripheral(s), such as BLUETOOTH peripheral(s), when a user purchases (a) wireless peripheral(s) along with an IHS, the factory, manufacturer, warehouse, and/or seller of the IHS may pre-pair the peripheral(s) to the IHS or a supplied dongle. Also, conventionally, when a user purchases an aftermarket wireless peripheral, such as a BLUETOOTH peripheral, for use with an IHS, the purchaser may be called on to pair the aftermarket wireless peripheral with their IHS.

SUMMARY

Embodiments of automated multi-client and multi-mode wireless device pairing and connection methods and systems are described. In an illustrative, non-limiting example, a multi-client and multi-mode pairing and connection wireless peripheral device may determine whether the wireless peripheral device is paired with a central client device. In response to a determination the wireless peripheral device is paired, the wireless peripheral device may connect with the central client device in the following manner and method. The wireless peripheral device may select a saved long term bonding key, based at least in part on a user selected mode of the wireless peripheral device and determine whether a predetermined scan timeout has expired. In response to a determination that the predetermined scan timeout has expired, the wireless peripheral device may switch to another saved long term bonding key. The wireless peripheral device may further determine whether a predetermined overall connection timeout has expired. In response to a determination that the predetermined overall connection timeout has expired, the wireless peripheral device repeats determining whether a predetermined scan timeout has expired and switching to another saved long term bonding key in response to a determination that the predetermined scan timeout has expired. However, in response to a determination that the predetermined scan timeout has not expired, the wireless peripheral device advertises for a connection, checks for a central client device request to connect, and connects to the central client device in response to initiation of a connect request from the central client device.

However, in response to a determination the wireless peripheral device is not paired, the wireless peripheral device pairs with the central client device, by first, setting one or more keys to be used to generate a long term paring key, based at least in part on the user selected mode of the wireless peripheral device. The wireless peripheral device then bonds with the central client device by using the one or more keys to generate the long term paring key, distributes the long term pairing key to the central client device, and saves the long term pairing key, as a long term bonding key, based at least in part on the user selected mode of the wireless peripheral device.

Following saving the long term pairing key, based at least in part on the user selected mode of the wireless peripheral device, the wireless peripheral device may establish a secure channel between the wireless peripheral device and the central client device, and set the predetermined scan timeout, based on an attribute provided by the central client device. For example, the wireless peripheral device may be a BLUETOOTH enabled device and the predetermined scan timeout may be a BLUETOOTH generic attribute profile attribute (GATT). Additionally, or alternatively, where the wireless peripheral device is a BLUETOOTH enabled device, the long term pairing key and long term bonding key is a BLUETOOTH long term key.

The wireless peripheral device of claim 10, wherein the wireless peripheral device may be a human interface device (HID). Regardless, the wireless peripheral device may include a mechanism configured to accept selection of the user selected mode of the wireless peripheral device. This mechanism may be one or more buttons configured to select between a plurality of central client devices and/or a wireless communication adapter, but herein, the wireless peripheral device may accept selection of the user selected mode of the wireless peripheral device via a length of a press of one of the buttons, via a number of clicks of one of the buttons, and/or the like. Regardless, the user selected mode of the wireless peripheral device may be a user selected one of an operating system mode and a basic input output system mode, a user selected one of a first operating system mode and a second operating system mode, etc.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
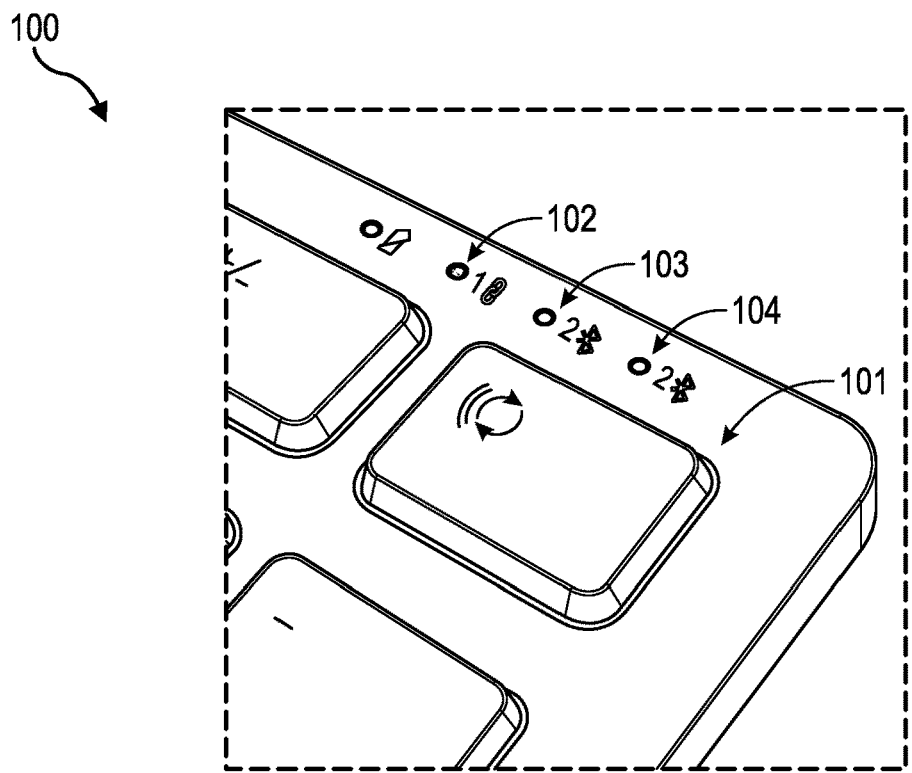
FIG. 1 is a partially fragmented view of an Information Handling System (IHS) keyboard having a single wireless pairing button configured to pair the keyboard with multiple devices, according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. A more detailed example of an IHS is described with respect to FIG. 7.

Most IHS (e.g., Personal Computer (PC)) Human Interface Devices (HIDs) (e.g., keyboards and mouses) are shipped with a Universal Serial Bus (USB) dongle (e.g., a wireless communications adapter) which allows for these HID devices to work in in both a Pre-Operating System (pre-OS), for All-In-One (AIO) recovery and pre-boot operation, and in an Operating System (OS) mode (i.e., operate under an OS). Some IHS form factors may not allow support for USB dongles on PC platforms and increasingly PC accessory Original Equipment Manufacturers (OEMs) are moving away from USB dongles, or the like, as a default accessory connectivity options. Hence, IHSs are increasingly using wireless connectivity standards, such as BLUETOOTH, to connect with HIDs.

BLUETOOTH, and other wireless connectivity, services generally require either encryption or authentication and as such require pairing before they let a remote device connect. Under wireless connectivity protocols such as BLUETOOTH, two devices pair by creating a "shared secret" known as a link key ("LTK" under the BLUETOOTH standard). If both devices store the same link key, they are said to be paired or bonded. A device that wants to communicate only with a bonded device can cryptographically authenticate the identity of the other device, ensuring it is the same device it previously paired with. Once a link key is generated, an authenticated Asynchronous Connection-Less (ACL) link between the devices may be encrypted to protect exchanged data against eavesdropping. Typically, users can delete link keys from either device, which removes the bond between the devices.

Traditionally, there is no method to enable a paired wireless device, such as a BLUETOOTH device, to seamless and secure pair and connect across both pre-boot (e.g., BIOS) and runtime OS environments. As used herein, the phrase "OS mode," or the like, refers to an IHS's (first or primary) runtime OS environment, while the terms "pre-OS mode," "BIOS mode," "ALT mode," or the like, refer (interchangeably) to another runtime environment the IHS may operate in such as a BIOS runtime environment, a runtime environment under another (second or non-primary) OS, or the like. Embodiments of the present systems and methods enable such seamless and secure wireless (e.g., BLUETOOTH) device pairing and connectivity across both pre-boot, and runtime OS, environments. While sharing a wireless (e.g., BLUETOOTH) pairing key across both Pre-OS and OS modes may address pairing of a device across both pre-boot (BIOS) and runtime OS environments, security requirements for each of these modes is handled separately and does not allow for an easy and secure method to share the key across the boundaries of the two modes. Embodiments of the present systems and methods support wireless (e.g., BLUETOOTH) devices in multiple modes, which can be generated by containers, multi-OSs, or the like, such as, in pre-OS and OS modes without the need of a dongle or sharing of a wireless (e.g., BLUETOOTH) pair secret, across pre-OS and OS domains.

Figure 2:
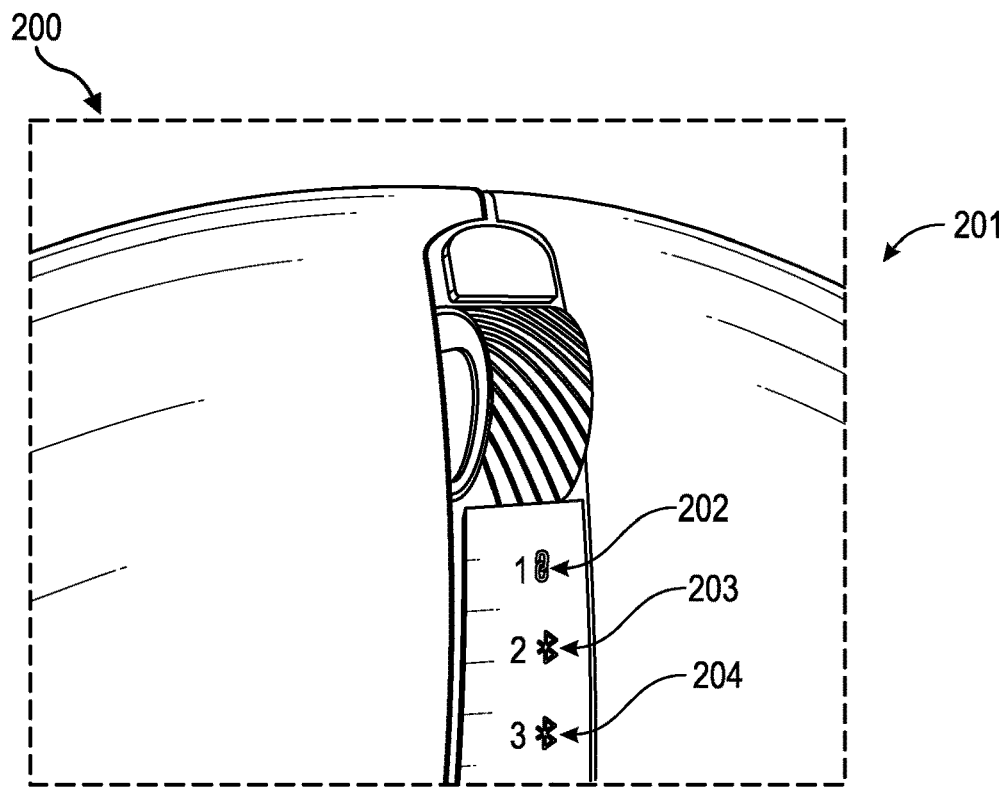
FIG. 2 is a partially fragmented view of an IHS mouse having a single wireless pairing button configured to pair the mouse with multiple devices, according to some embodiments.
Figure 3:
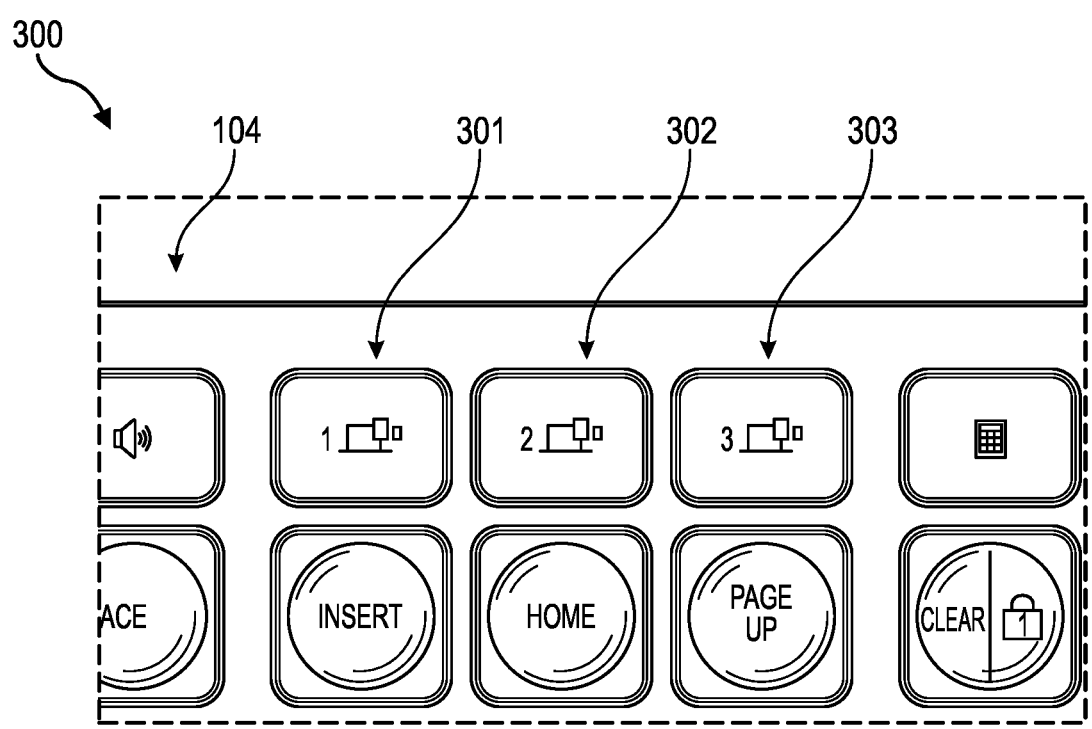
FIG. 3 is a partially fragmented view of an IHS keyboard having multiple wireless pairing buttons, each configured to pair the keyboard with a separate device, according to some embodiments.

HIDs, such as keyboards and mice typically use a specific button to pair with, and in many cases subsequently select and connect to, a paired client device (IHS). FIG. 1 is a partially fragmented view of IHS keyboard 100 having single wireless pairing button 101 configured to pair the keyboard with, and subsequently select between, multiple client devices, as indicated by indicator lights 102 though 104. FIG. 2 is a partially fragmented view of IHS mouse 200 having single wireless pairing button 201 configured to pair the mouse with, and subsequently select between, multiple client devices. Keyboard 100 or mouse 200 may have single button 101 or 201 that is used to pair with a client device (IHS) and to subsequently select the paired client device, as indicated by indicator lights 202 though 204. This single button may, typically, enable connectivity with an RF (USB) dongle and (or one of) two wireless paired protocol (e.g., BLUETOOTH) client devices, or the like. Other HIDs may have multiple buttons, each typically used to pair with a different client device, and subsequently used to select the respective paired client device. FIG. 3 is a partially fragmented view of IHS keyboard 300 having multiple wireless pairing buttons 301 through 303, each configured to pair keyboard 300 with, and subsequently select, a separate client device, as may also be indicated by indicator lights, or the like. In either case, an HID with a single pairing button or multiple paring buttons, the buttons may conventionally enable connectivity with one of three wireless protocol paired (e.g., BLUETOOTH) client devices (e.g., IHSs), one of which may be employing a BLUETOOTH Low Energy (BLE) based USB dongle, or the like.

However, in accordance with embodiments of the present systems and methods, each of these buttons may be used as a multi-function button to set a wireless connectivity (BLUETOOTH) paring mode, such as OS mode or an ALT (e.g., BIOS) mode. For example, a short press may operate the button for pairing in OS mode, while a long press may operate the button for paring in an ALT (BIOS) mode, or the like. In another example, a single press may operate the button for pairing in OS mode, while multiple clicks may rotate through modes, for pairing. After paring host software, such as the BIOS or an application program running under the OS on the client device may provide dynamic client configuration by optionally setting "Generic ATTribute Profile" (GATT) attributes on the peripheral device (HID) to configure scan intervals for connection and a default connection. During subsequent sessions the peripheral device scans to connect in the last paired mode (e.g., OS mode). However, after a timeout, as configured in the GATT attributes, the peripheral device scans to connect in a next paired mode (e.g., BIOS mode).

Embodiments of the present automatic multi-client and multi-mode wireless device protocol pairing and connecting systems and methods perform wireless device protocol (e.g., BLUETOOTH) pairing of an HID with the client device (IHS) in pre-OS and OS modes. The client device selected with an HID device button, as discussed above will, in accordance with embodiments of the present systems and methods, be able to connect in pre-OS or OS mode under the embodiments of the present systems and methods embodiments while maintaining user interface, and/or user experience, selected client device and/or channel on the HID. Under embodiments of the present systems and methods, peripheral devices (e.g., HIDs) can support existing methods for wireless device (e.g., BLUETOOTH) paring, including default out of box (OOB) pairing mode, with a press of a button pairing mode, or the like. Under embodiments of the present systems and methods pair button(s) of the HID (or other peripheral) can be configured as (a) multi-function button(s) to configure the peripheral in a secondary (e.g., ALT OS) mode for pairing. For example, a peripheral pairing button may be configured such that a long press, a double click, or the like can be used to configure the peripheral in multi-mode pairing with the same client device (IHS).

Figure 4:
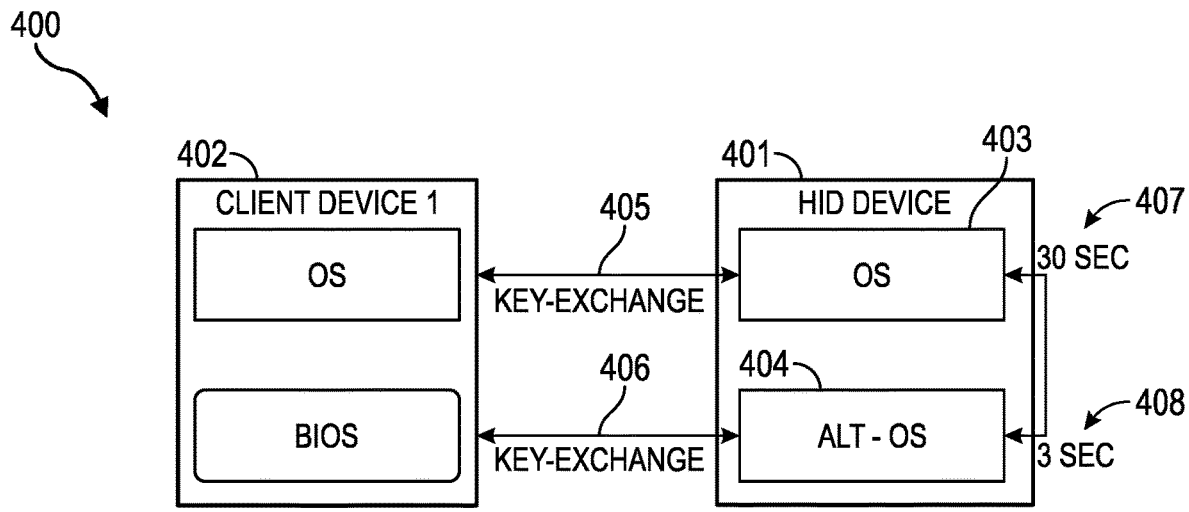
FIG. 4 is a block diagram of automated multi-client and multi-mode wireless device pairing and connection of a pre-configured peripheral device, according to some embodiments.

FIG. 4 is a block diagram of an embodiment of automated multi-client and multi-mode wireless device pairing and connection 400 of pre-configured peripheral device 401. In accordance with such embodiments of the present systems and methods, peripheral devices (HIDs) 401 may be pre-configured to use a feature such as BLUETOOTH "Secondary Link Key Management" as an alternate mode when using pre-configured state machine for BLUETOOTH "Connection Management," or the like. In such embodiments, when peripheral device 401 is paired in "Secondary Mode" under the BLUETOOTH standard, or the like, the link key (e.g., BLUETOOTH LTK) is shared as a "Secondary Link" key under the BLUETOOTH protocol, or the like, for the given client device (IHS) 402 and/or channel. In such embodiments, peripheral 401 will then attempt to connect with both the modes (OS 403 and ALT OS 404) of client device 402 when the corresponding channel 405 and 406 is selected on HID device 401, with a pre-configured time out 407, 408, or the like, for each mode, as discussed below with respect to FIG. 6. Thereby, the peripheral can be pre-configured to connect with the client device, including start in a pre-OS mode (BIOS mode), wait for a time-out, after which it will start under an OS mode, then after a second time out start under an ALT OS mode.

Figure 5:
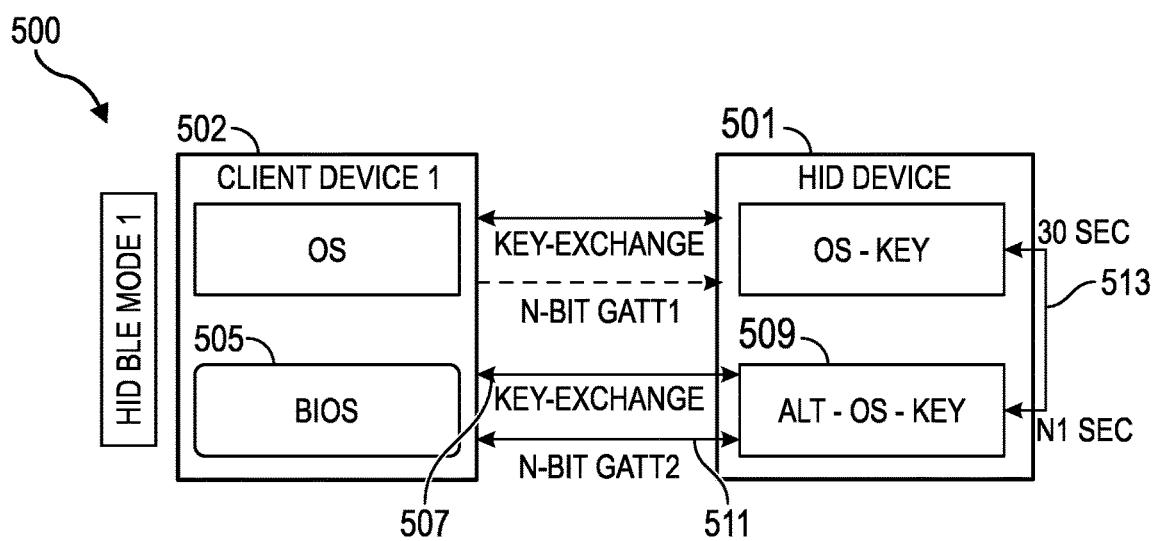
FIG. 5 is a block diagram of automated multi-client and multi-mode wireless device pairing and connection for a dynamic client configurable peripheral device, according to some embodiments.
Figure 5:
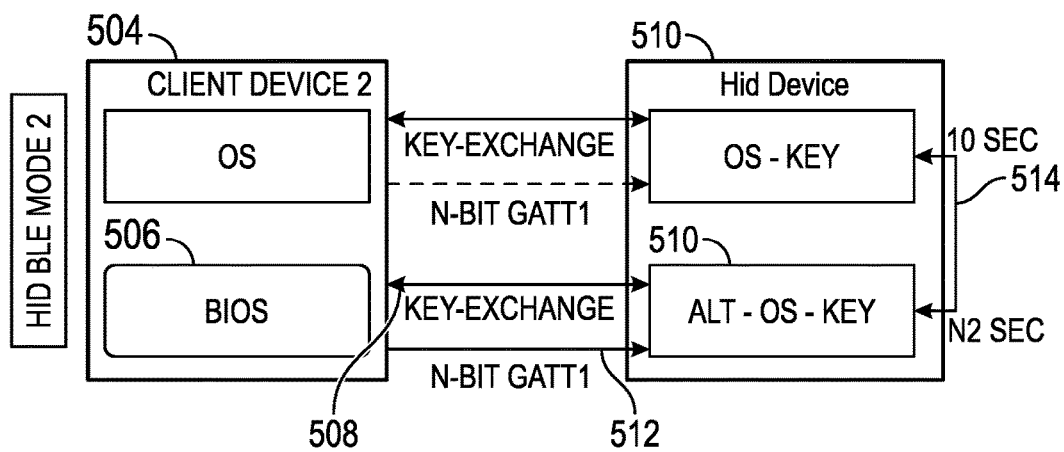

FIG. 5 is a block diagram of automated multi-client and multi-mode wireless device pairing and connection 500 for a dynamic client configurable peripheral device 501. In accordance with some embodiments of the present systems and methods, peripheral devices (HIDs) 501 may be dynamically configured by client device 502 or 504. Thereunder, client device 502 or 504 configures a connection state machine of the peripheral device after pairing. In such embodiments, the peripheral and client device in secondary (e.g., pre-OS mode (BIOS)) mode 505, 506 can perform the pairing function using the regular pairing process 507, 508. In this pre-OS mode, the Link Key (e.g., BLUETOOTH LTK) is saved as a secondary link key 509, 510 for the selected client device and/or channel. Once pairing is complete, peripheral 501 may, in accordance with such embodiments, be reconfigured 511, 512 using BLUETOOTH GATT attributes, or the like, based on the IHS platform 502, 504. The GATT attribute, or the like, will dynamically program a connection state diagram of peripheral 501 to manage the connection sequence and time outs 513, 514 as shown in FIG. 5. GATT characteristics, or the like, that may be used in accordance with embodiments of the present systems and methods, may include a default connect, time out(s) for the mode(s), and the like.

Further, in accordance with various embodiments of the present systems and methods, configurable BLE pairing and/or connect processes, or the like can be extended to workspace configurations and the GATT attributes, or the like can be used to enable or disable certain features of the paired peripheral (HID) device (e.g., for hoteling, cubicle or ecosystem configuration, as a service (aaS).) In one example, a client device (IHS) can configure a specific peripheral to be high priority to connect even if it may not be the last connected device.

Figure 6:
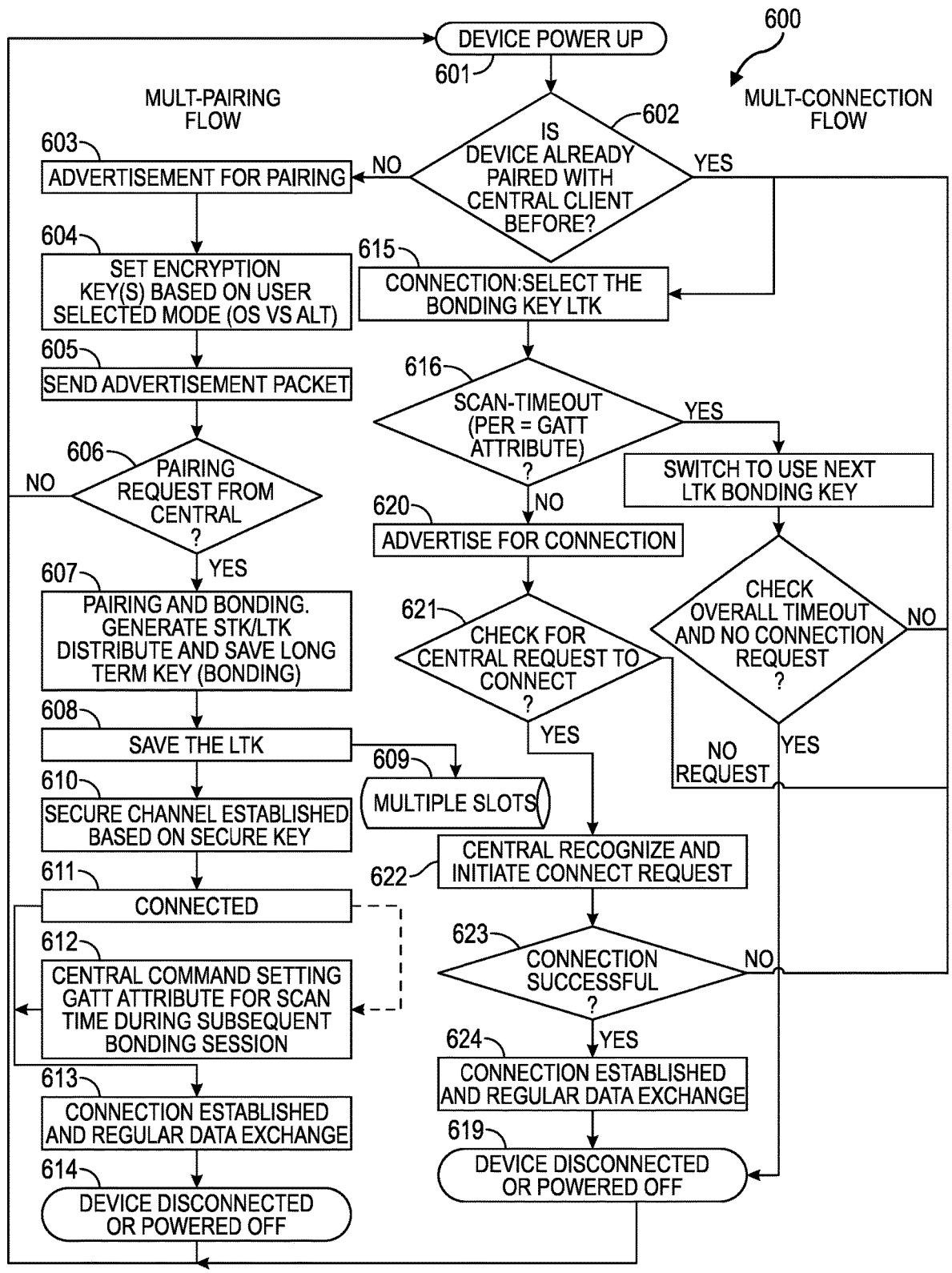
FIG. 6 is a flowchart of an example process for automated multi-client and multi-mode wireless device pairing and connection, according to some embodiments.

FIG. 6 is a flowchart of example process 600 for automated multi-client and multi-mode wireless device pairing and connection in accordance with at least one embodiment of the present systems and methods. Process 600 may be executed by logic (a wireless transceiver module, a microcontroller, an application specific integrated circuit (ASIC), or the like) operatively housed in the wireless device. Therein, on peripheral device (e.g., an HID) power up at 601, a determination is made at 602 by the peripheral as to whether the peripheral has already paired with a central client device (e.g., an IHS) before.

If it is determined at 602 that the device has not already paired with a central client, process 600 proceeds to multi-pairing, and at 603, the peripheral prepares to issue a (BLUETOOTH) "advertisement" for pairing, or the like, by, at 604, setting (i.e., generating) encryption (BLUETOOTH IR and ER) key(s), based on a client device user selected mode, such as an OS mode, a pre-OS mode, an alternate (ALT) OS mode, etc. The encryption key(s) generated at 604 may later be used to for building the LTK, or the like. Under BLUETOOTH specifications the ER and IR are 128-bit encryption keys generated for each device that supports encrypted connections. A resulting (BLUETOOTH) pairing "advertisement" packet is sent (i.e., wirelessly broadcast) at 605.

The peripheral then determines, at 606, whether a pairing request has been received from a central client device. If not, process 600 ends, waiting for peripheral power-on at 601. However, if a paring request is received by the peripheral from a central client device at 606 pairing and bonding proceeds, at 607, using the encryption keys (BLUETOOTH IR and ER keys) generated at 604, to generate a security key (i.e., a long term pairing key) such as an alternate security key (ATK), a more traditional (BLUETOOTH) security key (LTK), or the like. This security key is distributed at 607 for saving as a long term key (i.e., as an LTK, a long term bonding key) to provide bonding between the peripheral and the central client device. The LTK is saved by both the peripheral and the central client device at 608. In accordance with embodiments of the present systems and methods, the peripheral may employ multiple memory slots 609, or the like, to use as separate locations to store the bonding LTK key, separately as an OS mode LTK, as a pre-OS LTK, as an ALT LTK, and/or the like. That is, as discussed above with respect to FIGS. 4 and 5, in accordance with the present systems and methods, when the peripheral device is paired at 607 in "Secondary Mode" under the BLUETOOTH standard, or the like, the link key (e.g., BLUETOOTH LTK) is shared as a "Secondary Link" key under the BLUETOOTH protocol, or the like, for the given client device (IHS) and/or channel, and when the peripheral and client device is paired in secondary (e.g., pre-OS mode (BIOS)) the link key (e.g., BLUETOOTH LTK) is saved at 608 as a secondary link key for a user selected central client device and/or channel. The number of recognizable bonded or pre-paired devices may, in accordance with embodiments of the present systems and methods, depend on the number of memory slots (609) available to the peripheral.

At 610, a secure channel between the peripheral and the central client device, in accordance with the wireless connectivity protocol (e.g., BLUETOOTH protocol) using the "shared secret" LTK is established, and the peripheral and central client device are resultingly connected at 611. Once the peripheral and the central client device are connected at 610 and 611, a central BIOS or OS command, depending on whether the peripheral and the central client device are connected in the pre-OS (BIOS) mode or OS mode, may set GATT attributes at 612 to establish or change the duration for bonding scans to establish GATT attributes for the scan time used during subsequent bonding sessions, as discussed above with respect to FIG. 5 and as discussed below.

With the connection established, regular data exchange takes place at 613, until the peripheral is disconnected or powered off at 614, whereupon, process 600 ends, waiting for the peripheral to subsequently power-on again at 601.

During such a subsequent power on at 601, a determination is made at 602 that the device has already paired with the central client, and process 600 proceeds to multi-connection, where, at 615, the peripheral connects and selects the (last used) bonding key (LTK, long term bonding key), regardless (transparent) of the mode (pre-OS, OS, ALT-OS, etc.) the peripheral and the central client device are operating in. At 616, a determination is made whether the scan timeout, established per the GATT attribute (at 612), has elapsed. If the scan timeout has elapsed the peripheral switches to use a next LTK bonding key, at 617, as defined by the device selection state diagram for the peripheral. Then at 618 a determination is made as to whether an overall timeout has expired, with no connection request being made. If the overall timeout has not expired, process 600 returns to the beginning of the multi-connection at 615. However, if at 618 it is determined that the overall timeout has expired, the peripheral powers off at 619, process 600 ends, and the peripheral waits for power-on at 601.

Returning to 616, if a determination is made that the scan timeout, such as may be established per the GATT attribute (optionally, at 612), has not elapsed, the peripheral advertises (i.e., wirelessly broadcast) for a connection, at 620. A determination is made at 621 (per the wireless connectivity (BLUETOOTH) protocol) whether a central client device has made a request to connect (in response to the advertisement at 620). If it is determined at 621 that a central client device has not made a request to connect, process 600 returns to the beginning of the multi-connection at 615. However, if it is determined at 621 that a central client device has made a request to connect, the central client device recognizes the peripheral as a bonded or pre-paired peripheral (HID) device and initiates a connect request (per the wireless connectivity (BLUETOOTH) protocol) at 622. As noted, the number of recognizable bonded or pre-paired devices may, in accordance with embodiments of the present systems and methods, depend on the number of memory slots (609) available to the peripheral. A determination is then made at 623 as to whether the connection between the peripheral and the central client device has been made successfully. If it is determined at 623 that the connection has not been made between the peripheral and the central client device, process 600 returns to the beginning of the multi-connection at 615.

However, if it is determined at 623 that the connection has been made between the peripheral and the central client device, regular data exchange takes place at 624, until the peripheral is disconnected or powered off at 619, whereupon, process 600 ends, waiting for the peripheral to power-on again at 601.

Figure 7:
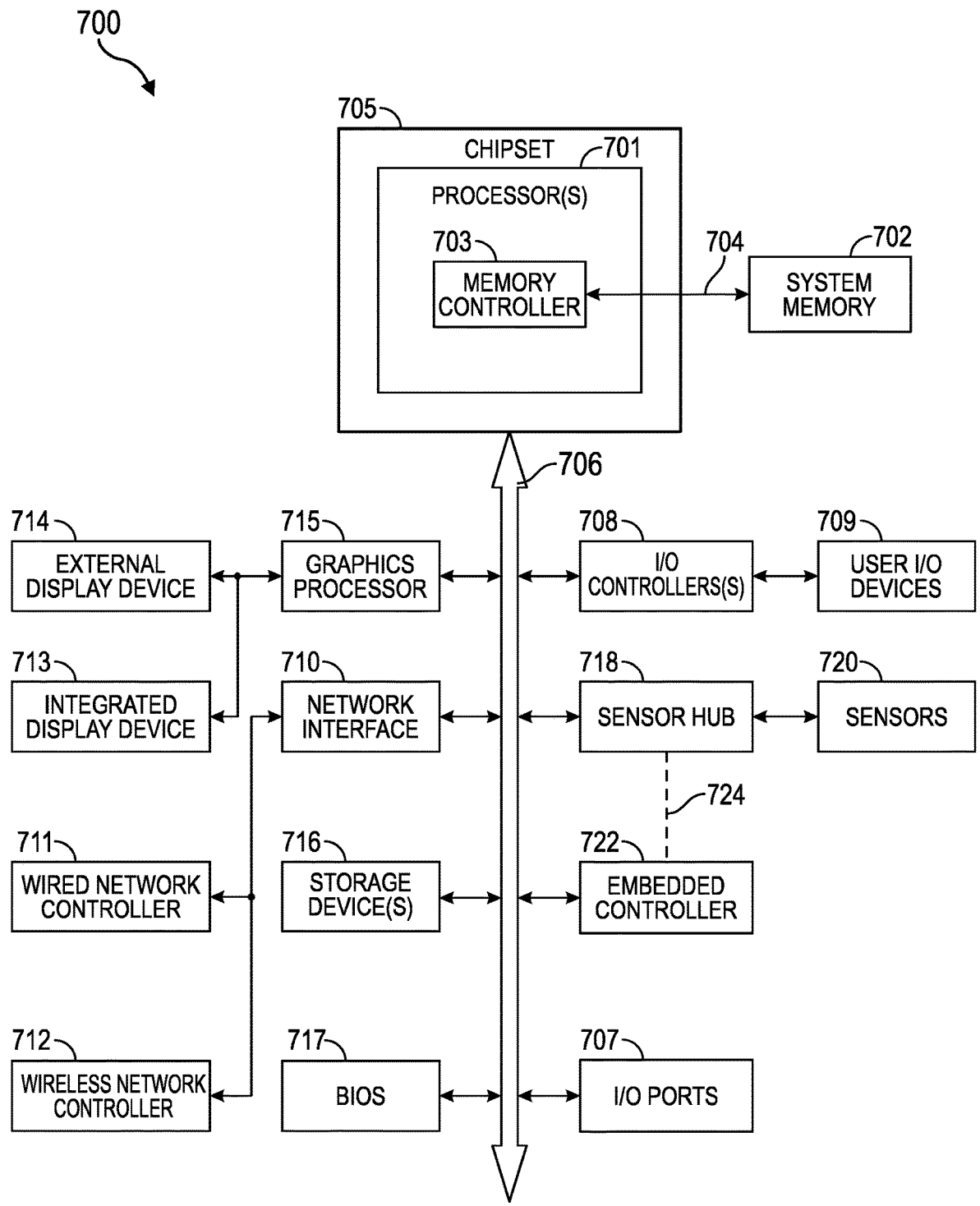
FIG. 7 is a block diagram illustrating components of an example of an IHS, according to some embodiments.

Thusly, embodiments of the present systems and methods provide solutions for wireless (BLUETOOTH) pair-and-connect in pre-OS, as well as OS, modes by enabling multiple link key's per device with device context and method to maintain fast connect in a chosen device mode. Embodiments of the present systems and methods dynamically configure connection state-diagram of the HID device from the client device based on platform BIOS needs or capabilities, and dynamically configure ecosystem peripherals for "Ecosystem as a Service" offering based on IHS platform (BIOS) or client device entitlements. Further, embodiments of the present systems and methods provide for fast reconnect with a primary client device, providing flexibility heretofore only available with proprietary dongle-based HID devices.

in accordance with embodiments of the present systems and methods, wireless devices, such as BLUETOOTH devices, are provided a consistent pairing and connect experience with intuitive user pairing and connection. Embodiments of the present systems and methods extend an ability to connect an HID in both BIOS and OS modes without divulging pairing key information. Embodiments of the present systems and methods provide intelligent connectivity, including intelligent optimization in connectivity based on key features, profiles and usage models FIG. 7 is a block diagram of an example of internal components of IHS 700, according to some embodiments. As shown, IHS 700 includes one or more processors 701, such as a Central Processing Unit (CPU), that execute code retrieved from system memory 702. Although IHS 700 is illustrated with a single processor 701, other embodiments may include two or more processors, that may each be configured identically, or to provide specialized processing operations. Processor(s) 701 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 7, processor(s) 701 includes memory controller 703 that may be implemented directly within the circuitry of processor(s) 701, or memory controller 703 may be a separate integrated circuit that is located on the same die as processor(s) 701. Memory controller 703 may be configured to manage the transfer of data to and from the system memory 702 of IHS 700 via high-speed memory interface 704. System memory 702 coupled to processor(s) 701 provides processor(s) 701 with a high-speed memory that may be used in the execution of computer program instructions by processor(s) 701. Accordingly, system memory 702 may include memory components, such as static RAM (SRAM), dynamic RAM (DRAM), NAND Flash memory, suitable for supporting high-speed memory operations by processor(s) 701. In certain embodiments, system memory 702 may combine both persistent, non-volatile memory and volatile memory. In certain embodiments, system memory 702 may include multiple removable memory modules.

IHS 700 utilizes chipset 705 that may include one or more integrated circuits that are connected to processor(s) 701. In the embodiment of FIG. 7, processor(s) 701 is depicted as a component of chipset 705. In other embodiments, all of chipset 705, or portions of chipset 705 may be implemented directly within the integrated circuitry of processor(s) 701. Chipset 705 provides processor(s) 701 with access to a variety of resources accessible via bus 706. In IHS 700, bus 706 is illustrated as a single element. Various embodiments may utilize any number of separate buses to provide the illustrated pathways served by bus 706.

In various embodiments, IHS 700 may include one or more I/O ports 707 that may support removeable couplings with various types of external devices and systems, including removeable couplings with peripheral devices that may be configured for operation by a particular user of IHS 700. For instance, I/O ports 707 may include USB (Universal Serial Bus) ports, by which a variety of external devices may be coupled to IHS 700. In addition to or instead of USB ports, I/O ports 707 may include various types of physical I/O ports that are accessible to a user via the enclosure of IHS 700.

In certain embodiments, chipset 705 may additionally utilize one or more I/O controllers 708 that may each support the operation of hardware components such as user I/O devices 709 that may include peripheral components physically coupled to I/O port 707 and/or peripheral components that are wirelessly coupled to IHS 700 via network interface 710. In various implementations, I/O controller 708 may support the operation of one or more user I/O devices 708 such as a keyboard, mouse, touchpad, touchscreen, microphone, speakers, camera and other input and output devices that may be coupled to IHS 700. User I/O devices 709 may interface with an I/O controller 708 through wired or wireless couplings supported by IHS 700. In some cases, I/O controllers 708 may support configurable operation of supported peripheral devices, such as user I/O devices 709.

As illustrated, a variety of additional resources may be coupled to processor(s) 701 of IHS 700 through chipset 705. For instance, chipset 705 may be coupled to network interface 710 that may support different types of network connectivity. IHS 700 may also include one or more Network Interface Controllers (NICs) 711 and 712, each of which may implement the hardware required for communicating via a specific networking technology, such as BLUETOOTH, in accordance with various embodiments of the present systems and methods, Wi-Fi, Ethernet and mobile cellular networks (e.g., CDMA, TDMA, LTE). Network interface 710 may support network connections by wired network controllers 711 and wireless network controllers 712. Each network controller 711 and 712 may be coupled via various buses to chipset 705 to support different types of network connectivity, such as the network connectivity utilized by IHS 700.

As illustrated, IHS 700 may support integrated display device 713, such as a display integrated into a laptop, tablet, 2-in-1 convertible device, or mobile device. IHS 700 may also support use of one or more external displays 714, such as external monitors that may be coupled to IHS 700 via various types of couplings, such as by connecting a cable from the external display 714 to external I/O port 707 of the IHS 700. One or more display devices 713 and/or 714 coupled to IHS 700 may utilize LCD, LED, OLED, or other display technologies. Each display device 713 and 714 may be capable of receiving touch inputs such as via a touch controller that may be an embedded component of display device 713 and/or 714 or graphics processor 715, or it may be a separate component of IHS 700 accessed via bus 706. In some cases, power to graphics processor 715, integrated display device 713 and/or external display 714 may be turned off or configured to operate at minimal power levels in response to IHS 700 entering a low-power state (e.g., standby). In certain scenarios, the operation of integrated displays 713 and external displays 714 may be configured for a particular user. For instance, a particular user may prefer specific brightness settings that may vary the display brightness based on time of day and ambient lighting conditions. As such, chipset 705 may provide access to one or more display device(s) 713 and/or 714 via graphics processor 715. Graphics processor 715 may be included within a video card, graphics card or within an embedded controller installed within IHS 700. Additionally, or alternatively, graphics processor 715 may be integrated within processor(s) 701, such as a component of a system-on-chip (SoC). Graphics processor 715 may generate display information and provide the generated information to one or more display device(s) 713 and/or 714, coupled to IHS 700.

Chipset 705 also provides processor(s) 701 with access to one or more storage devices 716. In various embodiments, storage device 716 may be integral to IHS 700 or may be external to IHS 700. In certain embodiments, storage device 716 may be accessed via a storage controller that may be an integrated component of the storage device. Storage device 716 may be implemented using any memory technology allowing IHS 700 to store and retrieve data. For instance, storage device 716 may be a magnetic hard disk storage drive or a solid-state storage drive. In certain embodiments, storage device 716 may be a system of storage devices, such as a cloud system or enterprise data management system that is accessible via network interface 710.

As illustrated, IHS 700 also includes Basic Input/Output System (BIOS) 717 that may be stored in a non-volatile memory accessible by chipset 705 via bus 706. Upon powering or restarting IHS 700, processor(s) 701 may utilize BIOS 717 instructions to initialize and test hardware components coupled to the IHS 700. BIOS 717 instructions may also load an OS (e.g., WINDOWS, MACOS, iOS, ANDROID, LINUX, etc.) for use by IHS 700. BIOS 717 provides an abstraction layer that allows the operating system to interface with the hardware components of the IHS 700. The Unified Extensible Firmware Interface (UEFI) was designed as a successor to BIOS. As a result, many IHSs utilize UEFI in addition to or instead of a BIOS. As used herein, BIOS is intended to also encompass UEFI.

As illustrated, certain IHS 700 embodiments may utilize sensor hub 718 capable of sampling and/or collecting data from a variety of hardware sensors 720. Sensors may provide access to data describing environmental and operating conditions of IHS 700 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, etc.). Generally, in various implementations, processor 701 may receive and/or produce context information using sensors 720 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 700, a physical keyboard external to IHS 700, or an on-screen keyboard), whether the user operating the keyboard is typing with one or two hands (e.g., holding a stylus, or the like), a time of day, software application(s) under execution in focus for receiving keyboard input, whether IHS 700 is inside or outside of a carrying bag, ambient lighting, a battery charge level, whether IHS 700 is operating from battery power or is plugged into an AC power source (e.g., whether the IHS is operating in AC-only mode, DC-only mode, or AC+DC mode), a power consumption of various components of IHS 700 (e.g., CPU 701, GPU 715, system memory 702, etc.), an operating temperature of components of IHS 700, such as CPU temperature, memory module temperature, etc. In certain embodiments, sensor hub 718 may be an independent microcontroller or other logic unit that is coupled to the motherboard of IHS 700. Sensor hub 718 may be a component of an integrated system-on-chip incorporated into processor 701, and it may communicate with chipset 705 via a bus connection such as an Inter-Integrated Circuit (I2C) bus or other suitable type of bus connection. Sensor hub 718 may also utilize an I2C bus for communicating with various sensors supported by IHS 700.

As illustrated, IHS 700 may utilize embedded controller (EC) 722, which may be a motherboard component of IHS 700 and may include one or more logic units. In certain embodiments, EC 722 may operate from a separate power plane from the main processors 701 and thus the OS operations of IHS 700. Firmware instructions utilized by EC 722 may be used to operate a secure execution system that may include operations for providing various core functions of IHS 700, such as power management, management of operating modes in which IHS 700 may be physically configured and support for certain integrated I/O functions. In some embodiments, EC 722 and sensor hub 718 may communicate via an out-of-band signaling pathway or bus 724.

In various embodiments, IHS 700 may not include each of the components shown in FIG. 7. Additionally, or alternatively, IHS 700 may include various additional components in addition to those that are shown in FIG. 7. Furthermore, some components that are represented as separate components in FIG. 7 may in certain embodiments instead be integrated with other components. For example, in certain embodiments, all or a portion of the functionality provided by the illustrated components may instead be provided by components integrated into the one or more processor(s) 701 as an SoC.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations. It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A method for automated multi-client and multi-mode wireless device pairing and connection comprising:
   determining, by a wireless peripheral device, whether the wireless peripheral device is paired with a central client device; and
   connecting, by the wireless peripheral device, in response to a determination the wireless peripheral device is paired, with the central client device, connecting comprising:
      selecting, by the wireless peripheral device, a saved long term bonding key, based at least in part on a user selected mode of the wireless peripheral device;
      determining, by the wireless peripheral device, whether a predetermined scan timeout has expired;
      switching, by the wireless peripheral device, to another saved long term bonding key, in response to a determination that the predetermined scan timeout has expired;
      determining, by the wireless peripheral device, whether a predetermined overall connection timeout has expired;
      repeating, by the wireless peripheral device, in response to a determination that the predetermined overall connection timeout has expired, the determining whether a predetermined scan timeout has expired and switching to another saved long term bonding key in response to a determination that the predetermined scan timeout has expired;
      advertising for a connection, by the wireless peripheral device, in response to a determination that the predetermined scan timeout has not expired; and
      checking for a central client device request to connect and connecting to the central client device, by the wireless peripheral device, in response to initiation of a connect request from the central client device.

2. The method of claim 1, further comprising:
   pairing, by the wireless peripheral device, in response to a determination the wireless peripheral device is not paired, with the central client device, pairing comprising:
      setting, by the wireless peripheral device, one or more keys to be used to generate a long term paring key, based at least in part on the user selected mode of the wireless peripheral device;
      bonding, by the wireless peripheral device, with the central client device, using the one or more keys to generate the long term paring key;
      distributing, by the wireless peripheral device, the long term pairing key to the central client device; and
      saving, by the wireless peripheral device and the central client device, the long term pairing key, as a long term bonding key, based at least in part on the user selected mode of the wireless peripheral device.

3. The method of claim 2, further comprising, following saving the long term pairing key, based at least in part on the user selected mode of the wireless peripheral device:
establishing a secure channel between the wireless peripheral device and the central client device; and
setting, by the central client device, the predetermined scan timeout.

4. The method of claim 3, wherein the wireless peripheral device is a BLUETOOTH enabled device and the predetermined scan timeout is a BLUETOOTH generic attribute profile attribute.

5. The method of claim 2, wherein the wireless peripheral device is a BLUETOOTH enabled device and the long term pairing key and long term bonding key is a BLUETOOTH long term key.

6. The method of claim 2, wherein the user selected mode of the wireless peripheral device comprises a user selected one of an operating system mode and a basic input output system mode.

7. The method of claim 2, wherein the user selected mode of the wireless peripheral device comprises a user selected one of a first operating system mode and a second operating system mode.

8. The method of claim 2, further comprising accepting, by the wireless peripheral device, selection of the user selected mode of the wireless peripheral device via a mechanism provided by the wireless peripheral device.

9. A multi-client and multi-mode pairing and connection wireless peripheral device comprising:
logic configured to:
determine whether the wireless peripheral device is paired with a central client device; and
connect with the central client device, in response to a determination the wireless peripheral device is paired, by:
selecting a saved long term bonding key, based at least in part on a user selected mode of the wireless peripheral device;
determining whether a predetermined scan timeout has expired;
switching to another saved long term bonding key, in response to a determination that the predetermined scan timeout has expired;
determining whether a predetermined overall connection timeout has expired;
repeating, in response to a determination that the predetermined overall connection timeout has expired, the determining whether a predetermined scan timeout has expired and switching to another saved long term bonding key in response to a determination that the predetermined scan timeout has expired;
advertising for a connection in response to a determination that the predetermined scan timeout has not expired; and
checking for a central client device request to connect and connecting to the central client device in response to initiation of a connect request from the central client device.

10. The wireless peripheral device of claim 9, wherein the logic is further configured to pair with the central client device, in response to a determination the wireless peripheral device is not paired, by:
setting one or more keys to be used to generate a long term paring key, based at least in part on the user selected mode of the wireless peripheral device;
bonding with the central client device by using the one or more keys to generate the long term paring key;
distributing the long term pairing key to the central client device; and
saving the long term pairing key, as a long term bonding key, based at least in part on the user selected mode of the wireless peripheral device.

11. The wireless peripheral device of claim 10, wherein following saving the long term pairing key, based at least in part on the user selected mode of the wireless peripheral device the logic:
establishes a secure channel between the wireless peripheral device and the central client device; and
sets the predetermined scan timeout, based on an attribute provided by the central client device.

12. The wireless peripheral device of claim 11, wherein the wireless peripheral device is a BLUETOOTH enabled device and the predetermined scan timeout is a BLUETOOTH generic attribute profile attribute.

13. The wireless peripheral device of claim 10, wherein the wireless peripheral device is a human interface device.

14. The wireless peripheral device of claim 10, wherein the wireless peripheral device is a BLUETOOTH enabled device and the long term pairing key and long term bonding key is a BLUETOOTH long term key.

15. The wireless peripheral device of claim 10, wherein the wireless peripheral device further comprises a mechanism configured to accept selection of the user selected mode of the wireless peripheral device.

16. The wireless peripheral device of claim 15, wherein the mechanism comprises one or more buttons configured to select between a plurality of central client devices and/or a wireless communication adapter.

17. The wireless peripheral device of claim 16, wherein the logic is further configured to accept selection of the user selected mode of the wireless peripheral device via a length of a press of one of the buttons.

18. The wireless peripheral device of claim 16, wherein the logic is further configured to accept selection of the user selected mode of the wireless peripheral device via a number of clicks of one of the buttons.

19. A non-transitory computer readable medium having program instructions stored thereon that, upon execution by a wireless peripheral device cause the wireless peripheral device to:
determine whether the wireless peripheral device is paired with a central client device; and
connect with the central client device, in response to a determination the wireless peripheral device is paired, by:
selecting a saved long term bonding key, based at least in part on a user selected mode of the wireless peripheral device;
determining whether a predetermined scan timeout has expired;
switching to another saved long term bonding key, in response to a determination that the predetermined scan timeout has expired;
determining whether a predetermined overall connection timeout has expired;
repeating, in response to a determination that the predetermined overall connection timeout has expired, the determining whether a predetermined scan timeout has expired and switching to another saved long term bonding key in response to a determination that the predetermined scan timeout has expired;

advertising for a connection in response to a determination that the predetermined scan timeout has not expired; and checking for a central client device request to connect and connecting to the central client device in response to initiation of a connect request from the central client device.

20. The non-transitory computer readable medium of claim 19, wherein upon execution by the wireless peripheral device the program instructions further cause the wireless peripheral device to:

pair with the central client device, in response to a determination the wireless peripheral device is not paired, by:

setting one or more keys to be used to generate a long term paring key, based at least in part on the user selected mode of the wireless peripheral device;

bonding with the central client device by using the one or more keys to generate the long term paring key;

distributing the long term pairing key to the central client device; and saving the long term pairing key, as a long term bonding key, based at least in part on the user selected mode of the wireless peripheral device.

* * * * *